June 28, 1966     M. LIARD     3,257,987
PORTABLE, FOLDABLE AND COLLAPSIBLE WATER CYCLE
Filed March 11, 1965     6 Sheets-Sheet 5
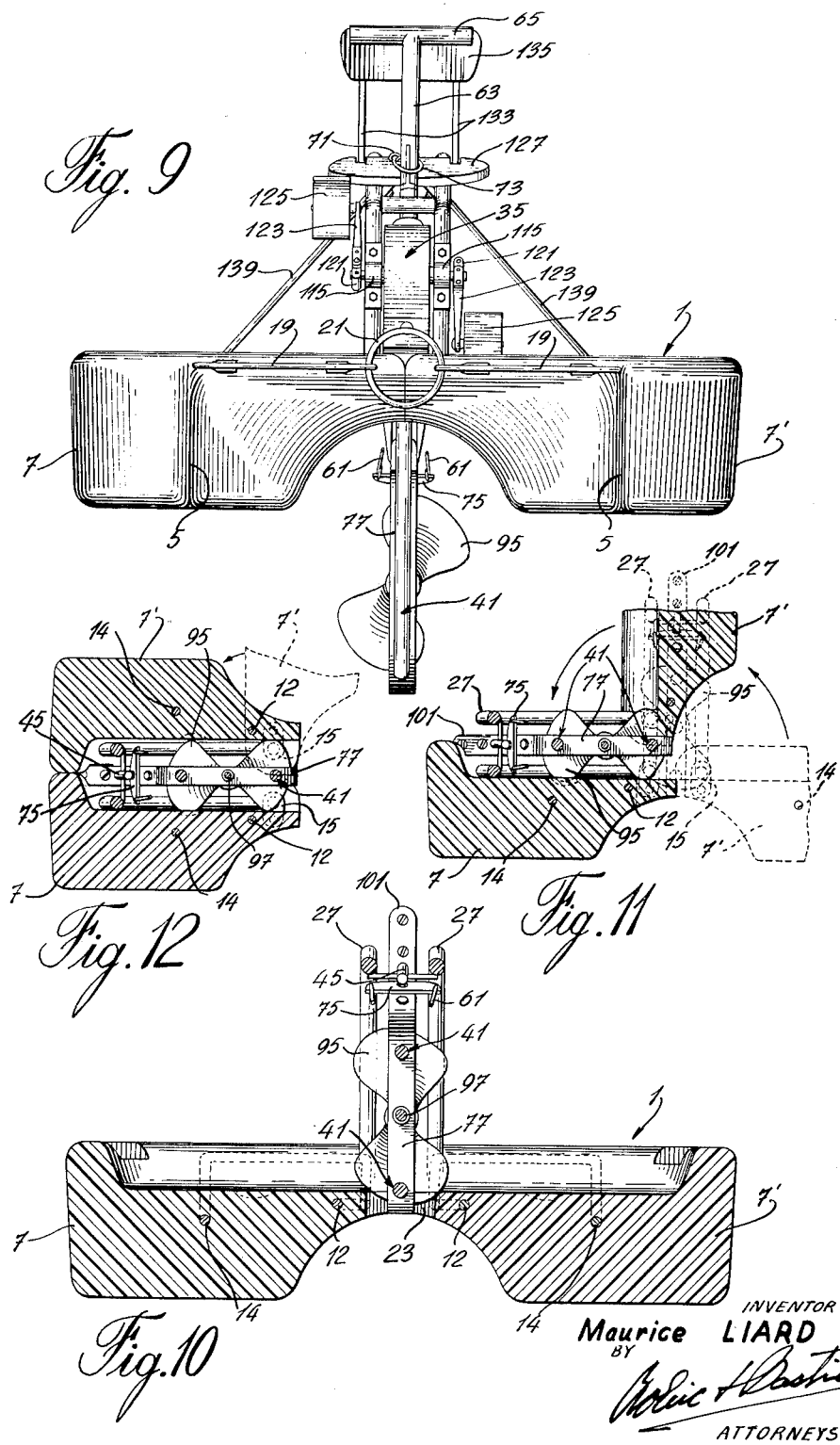
INVENTOR
Maurice LIARD
BY
ATTORNEYS

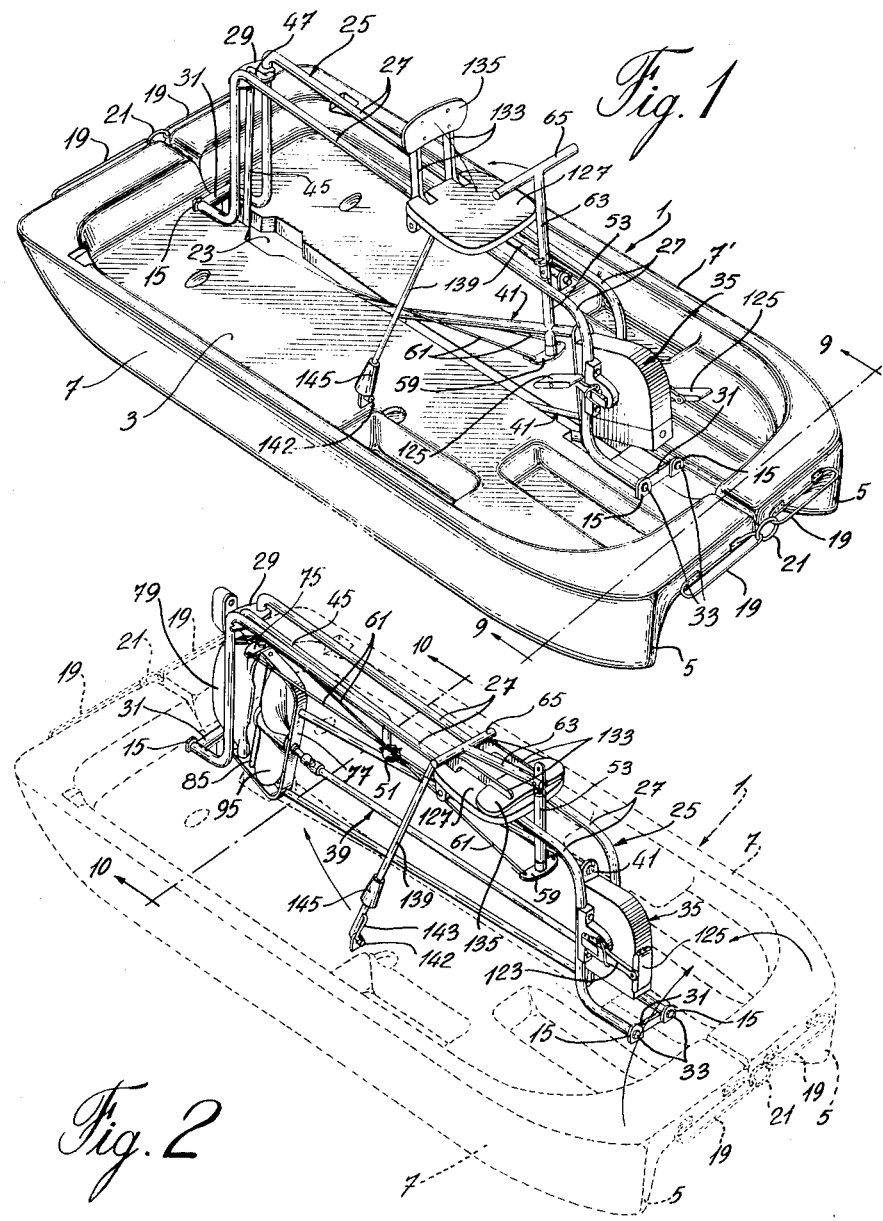

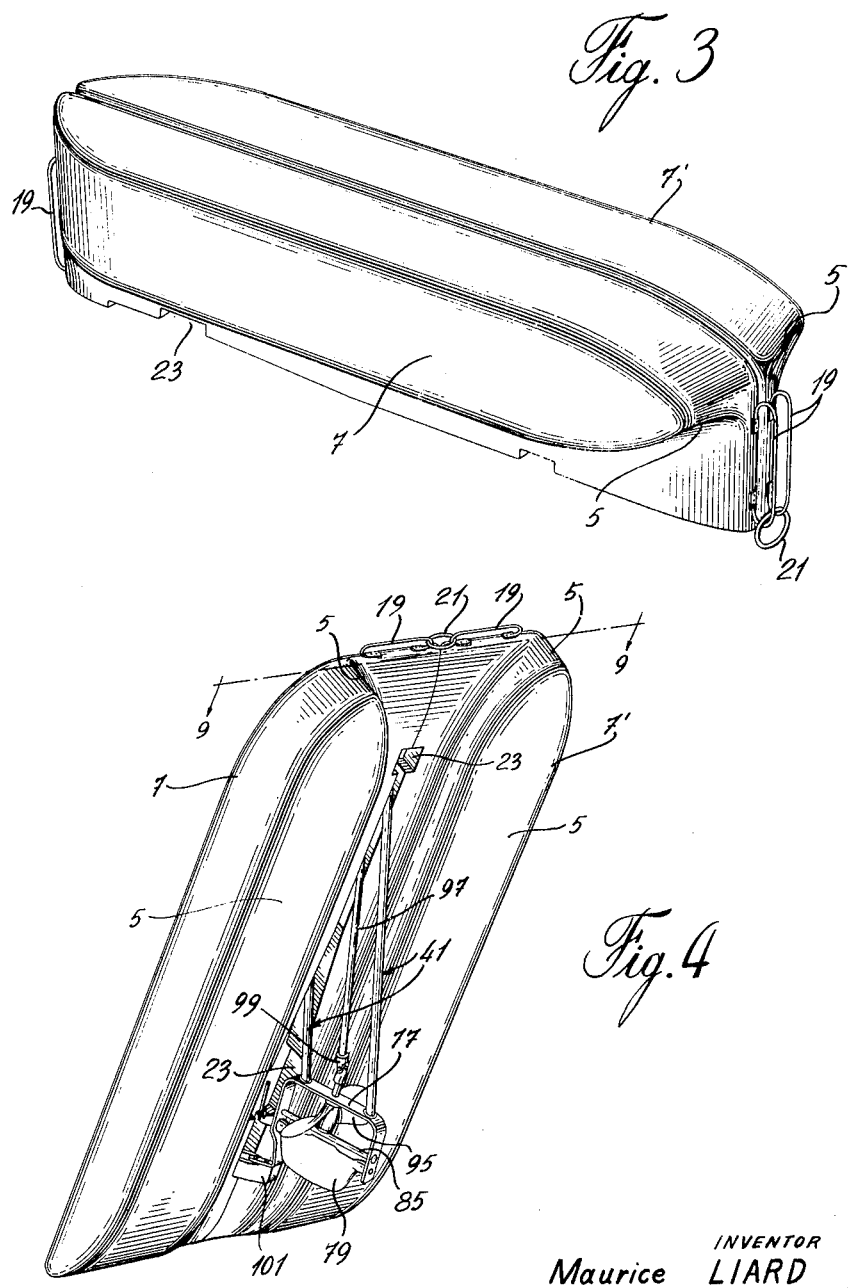

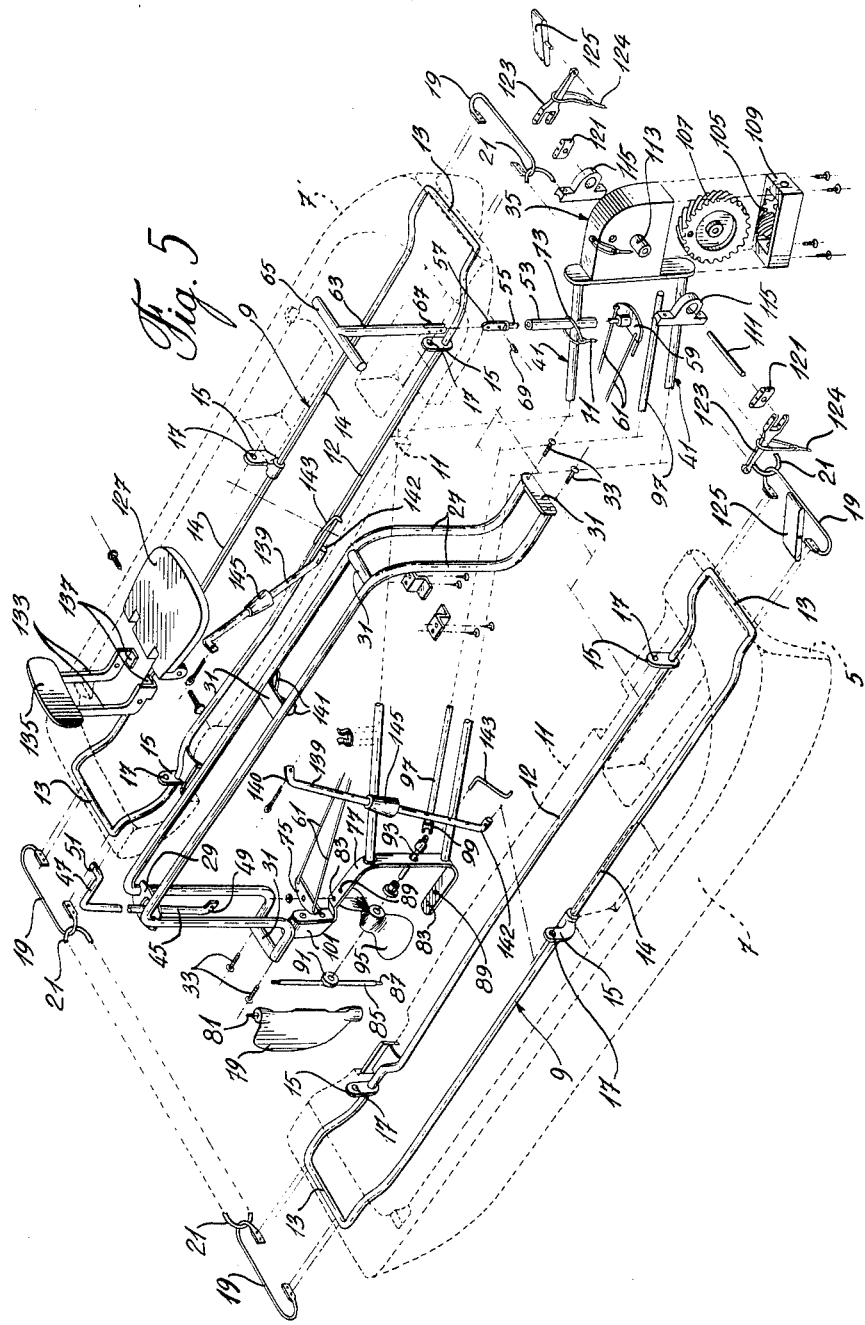

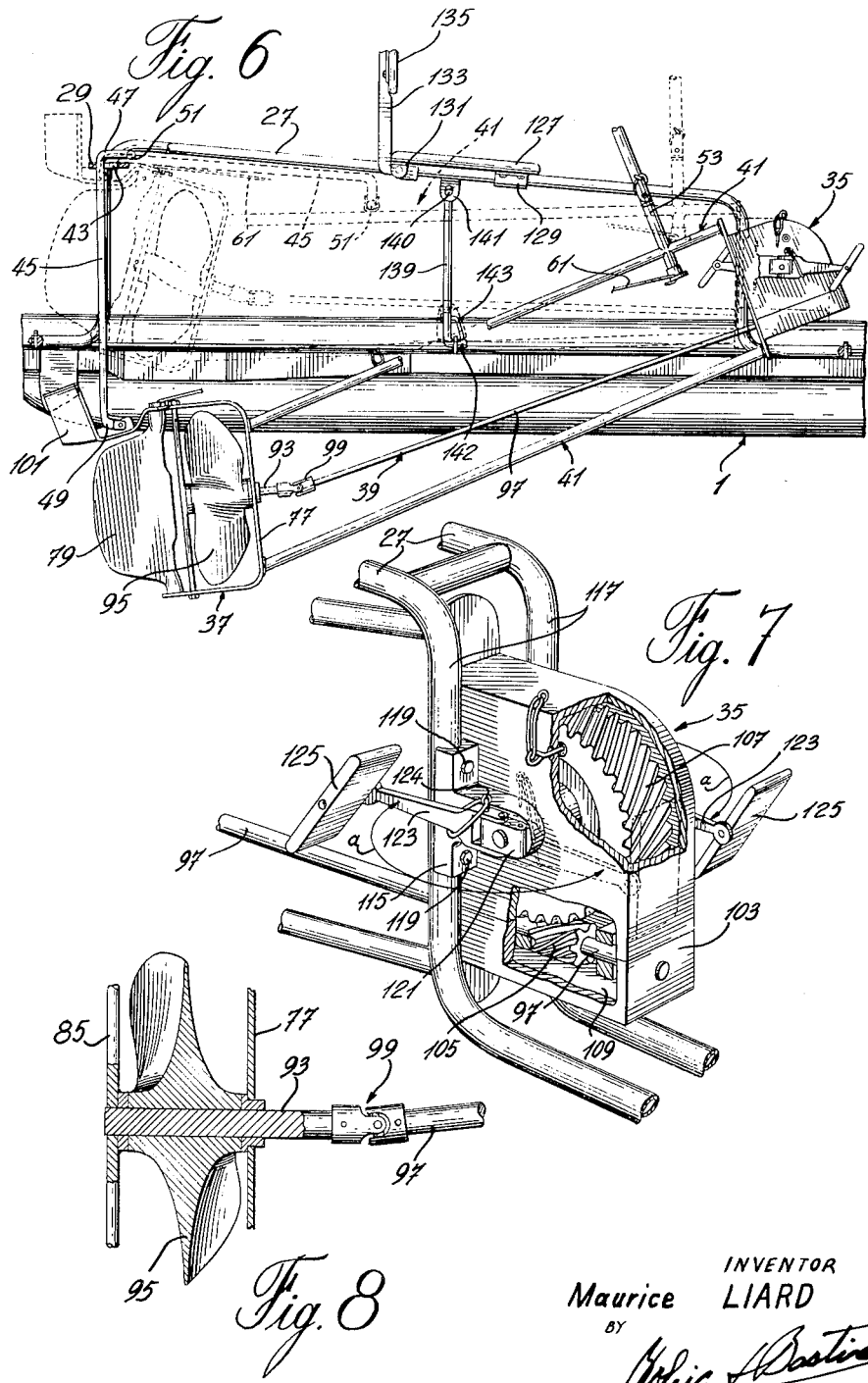

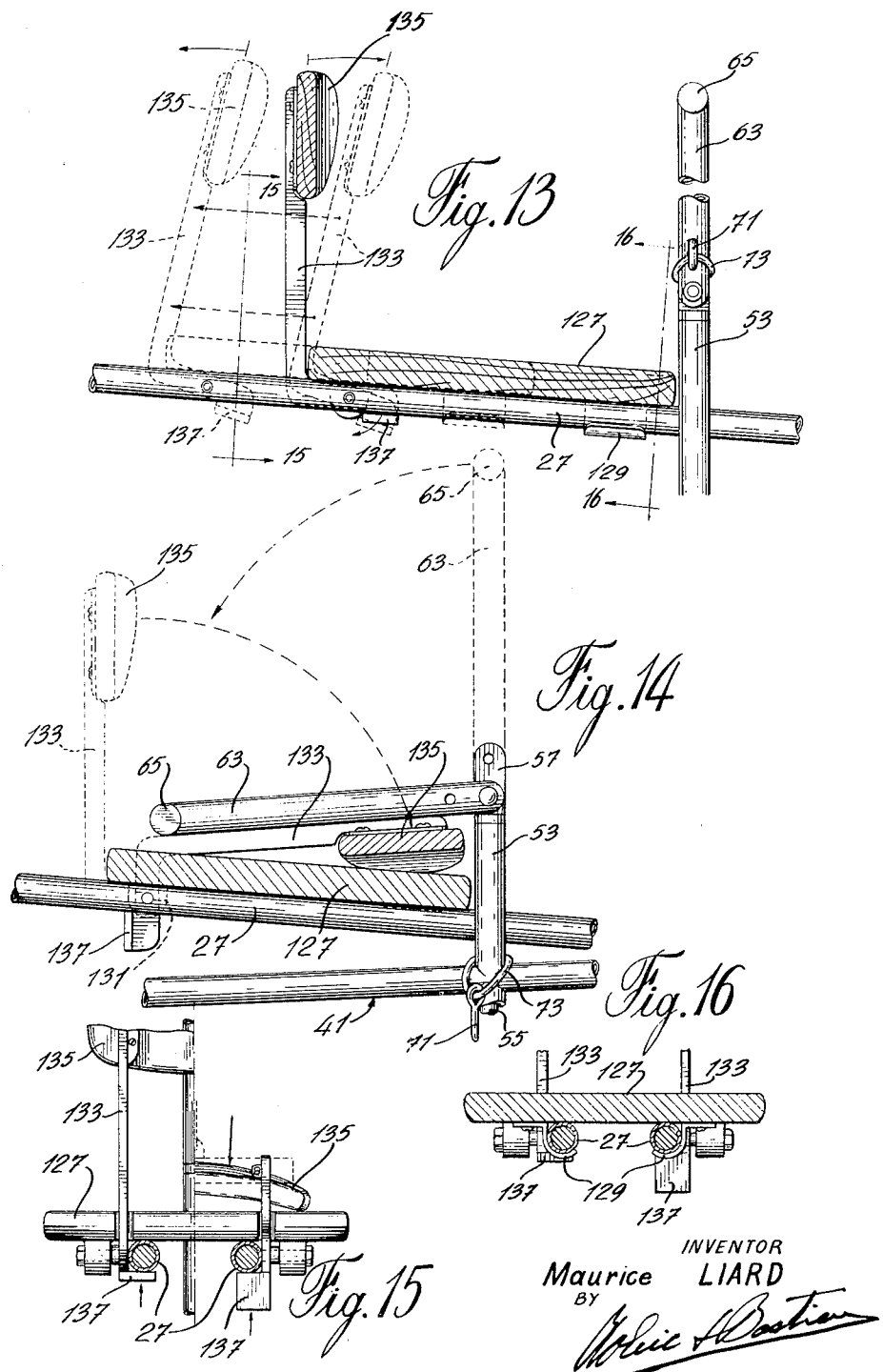

United States Patent Office 3,257,987
Patented June 28, 1966

3,257,987
PORTABLE, FOLDABLE AND COLLAPSIBLE
WATER CYCLE
Maurice Liard, 276 Salaberry, Joliette, Quebec, Canada
Filed Mar. 11, 1965, Ser. No. 438,880
16 Claims. (Cl. 115—22)

The present invention relates to a water cycle operable by the user through a system of pedals and is more particularly characterized by the fact that it is portable, foldable and collapsible so that it may conveniently be transported and easily mounted in or on a conventional motor vehicle such as a passenger car, station wagon or small truck.

The water cycle of the invention is an improvement of portable water cycles of this type which have already been proposed, and distinguishes therefrom in a number of features all of which combine to form a very compact and easily transported unit that can be handled like a piece of luggage with an outer casing within which is completely housed the various mechanisms and other structure of the water cycle whereby no parts of the mechanism would tend to project out of the casing to make the handling awkward. Another important feature and object of the invention lies in the case with which the water cycle can be completely collapsed and folded as well as the ease with which it can be unfolded and erected.

Still another feature and object of the invention resides in the possibility of manufacturing the hull or floating platform and the remaining structure separately; the said remaining structure being mountable on the floating platform with a minimum of work.

The above noted features and objects are obtainable in a water cycle made according to the invention and comprising a platform made of a material capable of floating in water and hollowed out through the above-water surface, the platform being formed of two distinct floats abutting one another along a longitudinal center line of the assembled platform and capable of being placed one over the other to form a hollow casing. A rigid structure of a size to fit in the follow casing is mounted on both floats, along the said platform longitudinal center line, to pivot relative to the floats about axes parallel to the center line. Thus, through the pivoting action of the structure, the two floats can be folded one over the other with the said structure housed in the enclosure formed by the two floats.

The floats are formed to define a passage through the platform along the center line and under the said structure, the passage being provided to allow the displacement of a driving and propelling assembly, movable as a unit, having a driving part mounted at one end of the structure to pivot about an axis normal to the center line; the unit having a propelling part at the other end of the frame movable in a plane through said center line as the unit pivots about the said normal axis.

The said driving and propelling assembly is arranged within the structure so that it can also be housed in the above mentioned enclosure or hollow casing whenever the water cycle is folded to be carried away.

Other features and objects of the invention will become apparent from the following description of a preferred embodiment thereof with reference to the appended drawing wherein:

FIG. 1 is a perspective view of the water cycle of the invention shown in erected condition, ready for use;

FIG. 2 is a perspective view of the operating mechanism illustrated in folded condition with the hull or floating platform shown in broken lines;

FIG. 3 is a perspective view of the water cycle in folded condition;

FIG. 4 is a perspective view showing the bottom of the water cycle in erected position;

FIG. 5 is an exploded view of the water cycle of the invention;

FIG. 6 is a side elevation view of the driving mechanism illustrated in operating position;

FIG. 7 is an enlarged perspective view, partly cut away, of the driving means of the water cycle;

FIG. 8 is a side elevation view, partly in cross-section, of the propeller of the water cycle and part of the power transmission;

FIG. 9 is a front elevation view of the water cycle in erected position;

FIG. 10 is a cross-sectional view taken along line 10—10 of FIG. 2, the water cycle being in erected position;

FIG. 11 is a view similar to that of FIG. 10 with the water cycle partially folded;

FIG. 12 is a cross-sectional view similar to those of FIGS. 10 and 11 in completely folded condition of the water cycle;

FIG. 13 is a side elevation view, partly in cross-section, of the seat mounting;

FIG. 14 is a side elevation view particularly illustrating the steering rod and the seat is folded conditions;

FIG. 15 is a rear elevation view of the seat locking mechanism shown, in one-half section, in erected condition of the back of the seat and in the other half section in collapsed position of the back of the seat, both half sections being taken along line 15—15 of FIG. 13;

FIG. 16 is a cross-sectional view along line 16—16 of FIG. 13.

Particular reference being had to FIG. 1, the water cycle of the invention is shown to comprise a generally flat and rectangular floating platform 1 hollowed out as at 3 through the above-water surface, the platform being built to define twin hulls 5 in catamaran manner. It will be seen that the platform results in the abutment of two floats 7, 7' joining at the center line of the platform; 7, 7' being generally symmetrical about a vertical plane through said center line. It will thus be understood that the two floats may be placed one over the other in the manner illustrated in FIG. 3 whereby to form a hollow casing. The manner in which the two floats 7, 7' are held in folded or unfolded positions will be described hereinafter.

Each float is molded out of cellular plastic material, such as polystyrene, and thereafter covered with fiberglass-reinforced plastic whereby to be floatable on water when carrying the normal load to which the water cycle is adapted.

A tubular armature is embedded in the cellular plastic material during molding thereof (see FIG. 5) and is in the form of an elongated rectangular loop 9 one branch 12 of which is set near the abutting edge 11 while the end branches 13, 13' are set at the forward and rearward ends of the float. The above description of course applies to both floats 7, 7' since both are identical in construction, being symmetrical as mentioned above.

Eyelets 15, secured to loop 9 project upwardly through the cellular material and the fiberglass-reinforced plastic layer and have a hole 17 through the part thereof projecting above the said layer. One eyelet 15 is provided near each end of the lateral inner branch 12 while another eyelet is provided centrally of the loop lateral outer branch 14, all for a purpose to be determined later.

A rail 19 is provided at each end of each float, being secured to end branches 13 and having arcuate ends. A ring 21 engages in each two adjacent rails, the diameter of ring 21 being equal to the distance between two adjacent rail arcuate ends when the floats form a platform, as clearly shown in FIG. 1. Rails 19 and rings 21 serve to hold floats 7, 7' in abutment when the cycle is unfolded while rings 21 serve as gripping and carrying handle in folded condition (see FIG. 3).

Finally, floats 7, 7' are molded to define an elongated passage 23 (FIG. 1) through platform 1 for a purpose to be determined hereinafter. This is obtained by causing the abutting edges 11 of the floats to retrieve from one another.

The operating mechanism to be mounted on the aforedescribed boat or floating platform comprises a rigid structure 25 formed of a pair of spaced frames 27 rigidly interconnected by such means as a rearward plate 29 and intermediate and end struts 31 (see FIG. 5). The rigid structure 25 is of a size to fit in the aforesaid casing formed by the hollowed out floats, when folded, and is pivotally mounted on the boat or platform 1 along the abutting edges of floats 7, 7'. This may, for instance, be obtained by bolts 33 screwed into threaded bores in the ends of each frame 27 after having loosely passed through holes 17 of eyelets 15 located at the ends of the lateral inner branches 12 of the aforedescribed reinforcing loops 9 (see FIGS. 1, 2 and 5). In this manner, the mounting of the ends of frames 27 on the end eyelets 15 serves as pivot or hinge means for folding floats 7, 7' one over the other.

A driving and propelling assembly formed to move as a unit is mounted between frames 27. The assembly is most clearly illustrated in FIG. 6 and will be seen to comprise a driving part or means 35, a propelling part or means 37 and a transmission part or means 39 interconnecting the driving and propelling parts 35, 37. Both driving and propelling parts 35, 37 are solid with an interconnecting frame 41 whereby parts 35, 37, 39 are made to move as a unit between an inoperative position, above the floating platform 1 (shown in dotted lines in FIG. 6) and an operative position where the propelling part 37 is below the floating platform (shown in full lines in FIG. 6). Means is provided to lock the aforedescribed driving and propelling assembly in these two positions, this means including the aforedescribed rearward plate 29 which has an elongated hole 43 therethrough and an elongated locking rod 45 bent at each end as at 47, 49, bent end 47 further having a lateral extension 51 best illustrated in FIG. 5. Bent end 49 is pivotally mounted at the rearward upper end of propelling part 37.

As will be readily understood from FIG. 6, locking rod 45 extends through hole 43 in rearward plate 29 and the propelling part 37 is retained in lower or operative position when bent end 47 lies over plate 29 whereas it is held upwardly and in inoperative position after rod 45 has been raised and turned horizontal as shown in dotted lines in FIG. 6. This is permissible because of the bent end 49 which then becomes somewhat vertical in the aforesaid horizontal position of the locking rod 45. Lateral extension 51 will, in that position, be moved under operating cables 61 of the rudder assembly now to be described.

The rudder assembly (FIG. 5) may be of standard construction and consists of a bearing post 53, secured to the top member of interconnecting frame 41, and through which extends a rotatable steering pin 55 terminating at one end with a flattened head 57 having two holes therethrough, pin 55 being fixedly secured at the other end to a transverse arm 59 to which are fixed the above mentioned steering cables 61. A steering column 63 having a steering handle 65 is provided with an axial slot 67 through the other end into which is received the flattened head 57 of the steering pin 55. This end of the steering column is also provided with holes adapted to register with the hole through flattened head. A pivot pin 69 extends through the lower holes in both members 57 and 63 to allow pivoting of the steering column whereby it may be folded over the top part of frames 27 and over the seat to be hereinafter described (see FIG. 2). A locking pin 71 attached to a string 73 looped around bearing post 53 serves to lock the steering column 63 in use by insertion through the upper holes in flattened head 57 and the bottom of the said steering column 63.

After leaving transverse arm 59, steering cables 61 cross one another and are connected, at the other end, to the rudder steering plate 75 lying over the top branch of a yoke 77 which is part of the aforesaid interconnecting frame 41. The rudder 79 itself has a pair of coaxial pins 81 adapted to extend through holes 83 near the outer end of the top and bottom branches of yoke 77. The top pin 81 is in turn secured to the rudder steering plate 75 whereby rotation of the said plate 75 also causes a rotation of rudder 79.

Inwardly of rudder 79 is a propeller support rod 85 fixed to the two branches of yoke 77 in any known manner such as by having pins 87 formed at the ends thereof extend through holes 89, inwardly of holes 83, in yoke 77. Centrally of propeller support rod 85 is a bearing 91 for the reception of the propeller shaft 93 over which the propeller 95 is secured. Shaft 93 projects through the central part of yoke 77 acting as a bearing and is connected to the driving shaft 97 of the transmission part or assembly 39, previously mentioned. The connection is through a conventional universal joint or coupling 99. In this manner, and as best seen in FIG. 6, shaft 93 can be inclined only slightly downwardly for better efficiency in driving the water cycle.

The upper branch of yoke 77 projects rearwardly from the lower branch and thereto is connected a stabilizing block 101 adapted, in operative position of the propelling means 37, to lie in passage 23 between floats 7, 7' to thus prevent wobbling of the driving and propelling assembly during rotation of propeller 95.

The other end of the driving shaft 97 (see FIG. 7) is received in the driving means 35 and extends through the housing 103 thereof. Inside housing 103, driving shaft 97 is provided with a worm gear 105 in mesh with a helical gear 107, both gears mounted for rotation about axes normal to one another, in known manner. Worm gear 105 may conveniently be mounted in a receiving support and bearing 109 (FIG. 5) which also forms the bottom of housing 103.

Helical gear 107 is secured to a gear axle 111 journeying in axle bearing sleeves 113 secured on the side cheeks of housing 103, bearing sleeves 113 being received for rotation in bores through support brackets 115 fastened to risers 117 of frames 27 (see FIG. 7) as by means of screws 119.

It should be pointed out at this time that the complete driving and propelling assembly comprising the driving means 35, the propelling means 37, the transmission 39 and the interconnecting frame 41 form a unit which is pivoted to frames 27 by means of the said bearing sleeves 113 and support brackets 115.

Secured at the ends of gear axle 111 are two transverse rectangular plates 121 to the centers of which and along parallel edges are mounted the forked ends of stirrup members 123, to the other ends of which are secured a pair of driving pedals 125.

Reference to FIG. 7 will show that by being pivotally mounted centrally of transverse plates 121, stirrup members 123 and pedals 125 may be rotated 180° in accordance with arrow a. In operating position of pedals 125, the latter projects laterally outwardly of frames 27 while in inoperative position (FIG. 2), that is, after having been rotated 180°, one pedal will lie forwardly of housing 103 and inwardly of frames 27 while the other pedal will occupy a similar position rearwardly of housing 103. It will be appreciated that in inoperative position, pedals 125 will have receded within the general outline of frames 27 to thus become unobstructive when the water cycle is folded in the manner indicated above.

Stirrup members 123 may be locked in operative and inoperative positions by means of a locking pin 124 in a manner similar to the locking of the steering column 63 in operative position.

The upper horizontal parts of frames 27 define a pair of spaced parallel rails for the reception of the user's seat which is seen to comprise a seat part 127 having a pair of forward guiding brackets 129 depending from the lower surface thereof (FIG. 16).

Rearwardly of brackets 129 are two downwardly projecting lugs 131 to which are pivotally connected two L-shaped supports 133 for the transverse back 135. At the ends of supports 133, opposite the end to which back 135 is mounted, are two locking flanges 137 directed toward one another.

Reference to FIGS. 13 through 15 will show that the mounting of locking flanges 137 at the end of supports 133 is such that the weight of the user will tend to rotate supports 133 counterclockwise and thus force locking flanges 137 in frictional engagement with the said top parts of frames 27 (FIG. 13) while in folded condition of the back over the seat part 127 as in FIG. 14, the rearward edge of the locking flanges 137 will again engage frames 27 and thus prevent undue displacement of the seat over the rails.

Frames 27 are held in upright position by means of a pair of rigid braces 139 having hooked ends 140 and 142 extending at right angles to one another, the upper hooked ends 140 extending loosely across holes in lugs 141 (FIG. 6) depending below and secured to frames 27 while hooked ends 142 are received through the holes 17 in the previously mentioned eyelets 15 centrally of the lateral outer branches 14 of loops 9 (see FIG. 5).

The two hooked ends 140 may be tied to one another to prevent their removal from lugs 141 while hooks 143 pivotally secured to braces 139 may have an end thereof projecting into a hole through hooked end 142 after the latter has extended through the hole 17 in the receiving eyelets 15. Conical caps 145 may be slid over hooks 143 to prevent undue disengagement of hooks 143 that would release braces 139.

With reference to FIGS. 1, 2 and 9 to 12 the sequence of folding operations may be as follows, starting with the erected position of FIG. 1:

Frame 41 (interconnecting the driving means 35 and the propelling means 37) is raised by means of the locking rod 45, the end 51 of which is tucked under steering cables 61. Seat back 135 is folded over seat part 127 and steering column and handle 63, 65 are bent over back 135. Stirrup members 123 and pedals 125 are turned 180° so that the latter lie forwardly and rearwardly of driving means housing 103. These conditions are illustrated in FIGS. 2 and 10.

Then braces 139 of frames 27 are released and disposed under the latter. There is nothing then to prevent folding of floats 7, 7' one over the other by pivoting about bolts 33 (FIG. 5) at the lower ends of frames 27. The folding operation takes places in the manner illustrated in FIGS. 11 and 12. The parts may be locked in folded condition by sliding rings 21 to the other end of rails 19 (FIG. 3) to be used as handles.

It will be understood that although a specific embodiment of the invention has just been described, many modifications may be made thereto which are still within the spirit of the invention, the scope of which is defined in the appended claims.

I claim:

1. A portable foldable and collapsible water cycle comprising:
   (a) a pair of floats capable of abutment along at least part of respective lateral edges to form a floating platform; said platform hollowed out through a surface thereof whereby said floats define, when applied one over the other, a hollow casing;
   (b) a rigid structure of a size to fit in said casing and interconnecting said floats;
   (c) means mounting said structure on said platform and along said edges for pivotal movement relative to said floats about axes parallel to said edges whereby said floats may be folded one over the other to form said hollow casing with said structure in said casing;
   (d) parts of said edges, below said structure, receded to define a passage through said platform;
   (e) a combined driving and propelling assembly formed to move as a unit and comprising a driving and a propelling part;
   (f) means to mount the driving part of said assembly at one end of said structure for pivotal movement about an axis normal to said structure to allow movement of the propelling part of said assembly in the plane of said structure and from an inoperative position above said platform to an operative position below said platform, through said passage.

2. A water cycle as claimed in claim 1, including means to releasably lock said structure in upright position on said platform.

3. A water cycle as claimed in claim 1, including means to releasably lock said assembly in anyone of said two positions.

4. A water cycle as claimed in claim 1, wherein said driving and propelling assembly includes transmission means operatively coupling said driving and propelling parts.

5. A portable foldable and collapsible water cycle comprising:
   (a) a pair of floats capable of abutment along respective edges to form a floating platform having an above-water surface; said platform hollowed out through said surface whereby said floats define, when applied one over the other, a hollow casing;
   (b) a pair of spaced rigidly interconnected frames of a size to fit into said hollow casing;
   (c) means mounting each end of each frame along the abutting edge of one of said floats for pivoting movement relative to the respective float about an axis parallel to said abutting edges whereby said floats may be folded one over the other to form said hollow casing with said frames wholly received within said casing;
   (d) means releasably holding said frames in upright position relative to said platform when said floats abut to form said platform;
   (e) a driving and propelling assembly formed to move as a unit and mounted between said frames; said assembly including driving means at one end of said frame, propelling means at the other end thereof and transmission means coupling said driving and propelling means together;
   (f) means mounting said driving means at said end for pivotal movement of said driving and propelling assembly as a unit about an axis transverse to said frames and from an inoperative position of said assembly when said propelling means is between said frame and above said platform to an operative position when said propelling means is below said platform relative to said above-water surface;
   (g) parts of said abutting edges, below said frames, receded to allow free passage of said propelling means; and
   (h) means to lock said driving and propelling assembly in said two positions of said propelling means.

6. A water cycle as claimed in claim 5, wherein said driving means comprises a pair of pedal assemblies including pedals extending, in operative position thereof, transversely of said frames and away from one another; means to pivot said pedal assemblies so that said pedals extend transversely of said frames and unobstructively toward one another into inoperative position and means to lock said pedal assemblies in either of said positions.

7. A water cycle as claimed in claim 5, wherein said means releasably holding said frames in upright position is a pair of rigid braces each pivotally connected at one end to one of said frames; an eyelet on each of said floats; said braces engageable at their free ends in said eyelets to hold said frames in said upright position and releasable therefrom and foldable over said frames in folded position of said floats.

8. A water cycle as claimed in claim 5, wherein said means to lock said driving and propelling assembly comprises:
   a plate between said frames at the propelling means end thereof; said plate having a hole therethrough;
   a locking elongated rod loosely extending through said hole and having hooked ends; one hooked end pivotally connected to said propelling means, the other hooked end engageable with one of said frames, at the top thereof in inoperative position of said driving and propelling assembly and engageable with said plate in operative position of said assembly to limit dropping movement thereof.

9. A water cycle as claimed in claim 5, including a rail at each end of each float extending transversely thereof outwardly of said above-water surface, said rails having bent ends secured to said floats, and a ring engageable in each two adjacent rails; the diameter of said rings being equal to the distance between two adjacent rail bent ends when said floats form said platform whereby to hold said floats in abutment.

10. A water cycle as claimed in claim 5, wherein said floats are made of foamed plastic material covered with fiberglass-reinforced plastic.

11. A water cycle as claimed in claim 5, wherein said frames form at the top thereof a pair of spaced parallel rails; a seat slidably mounted on said rails; a back pivoted at the base thereof to said seat; at least one locking arm below said seat, secured to said back to pivot therewith and normal thereto; said arm having friction means thereon engageable with said rails in upright and folded positions of said back to prevent displacement of said seat in said two positions.

12. A portable foldable collapsible water cycle comprising:
   (a) a platform, capable of floating in water, hollowed out through the above-water surface and formed of two distinct floats abutting one another along the longitudinal center line of the platform whereby said floats may be placed one over the other to form a hollow casing;
   (b) a rigid structure of a size to fit in said hollow casing and mounted on both said floats, along said longitudinal center line, to pivot relative to said floats, about axes parallel to said center line;
   (c) said floats formed to define a passage through said platform along said center line and under said structure;
   (d) a driving and propelling assembly movable as a unit having a driving part mounted at one end of said structure to pivot about an axis normal to said center line; said unit having a propelling part at the other end of said frame movable through said passage and in a plane through said center line as said unit pivots about said normal axis; said assembly of a size to fit in said hollow casing.

13. A water cycle as claimed in claim 12, including means releasably holding said structure in upright position relative to said platform.

14. A water cycle as claimed in claim 13, wherein said means releasably holding said structure in upright position is a pair of rigid braces each pivotally connected at one end to said structure; an eyelet on each of said floats; means on said braces at the free end thereof engageable in said eyelets to hold said structure upright and foldable over said structure in folded position of said floats.

15. A water cycle as claimed in claim 14, wherein said floats are molded in cellular plastic material and covered with a layer of fiberglass-reinforced plastic; a metal armature embedded in said molded plastic and extending longitudinally of said floats; means securing said eyelets to said armature through said plastic covering layer; bearing means secured on said armature and extending through said covering layer forwardly of each end of said structure and pivot means on said structure cooperating with said bearing means to cause the said pivoting thereof about longitudinal axes.

16. A water cycle as claimed in claim 15, including a rail at each end of each float extending transversely thereof outwardly of said above-water surface, each rail having bent ends and a ring engageable in each two adjacent rails; the diameter of said ring being equal to the distance between two adjacent rail arcuate ends when said floats form said platform whereby to hold said floats in abutment, said rails being secured to said armature.

No references cited.

MILTON BUCHLER, *Primary Examiner.*

A. H. FARRELL, *Assistant Examiner.*